US007366922B2

(12) United States Patent
Takeda et al.

(10) Patent No.: US 7,366,922 B2
(45) Date of Patent: Apr. 29, 2008

(54) POWER CONTROL FOR GAMING MACHINE

(75) Inventors: Kengo Takeda, Tokyo (JP); Hideaki Kishi, Tokyo (JP)

(73) Assignee: Aruze Corp., Tokyo (JP)

( * ) Notice: Subject to any disclaimer, the term of this patent is extended or adjusted under 35 U.S.C. 154(b) by 266 days.

(21) Appl. No.: 11/003,524

(22) Filed: Dec. 6, 2004

(65) Prior Publication Data

US 2005/0143177 A1 Jun. 30, 2005

(30) Foreign Application Priority Data

Dec. 12, 2003 (JP) ............................ 2003-414289

(51) Int. Cl.
*G06F 1/26* (2006.01)

(52) U.S. Cl. ......................... 713/300; 713/310; 463/47

(58) Field of Classification Search ........ 713/300–340, 713/1, 2; 463/43, 47
See application file for complete search history.

(56) References Cited

U.S. PATENT DOCUMENTS

| | | | | |
|---|---|---|---|---|
| 3,836,813 | A * | 9/1974 | Chambers | 713/300 |
| 4,038,675 | A * | 7/1977 | Kitai et al. | 396/250 |
| 4,209,826 | A | 6/1980 | Priegnitz | |
| 4,935,956 | A * | 6/1990 | Hellwarth et al. | 379/144.02 |
| 5,347,167 | A * | 9/1994 | Singh | 307/125 |
| 5,507,489 | A | 4/1996 | Reibel et al. | |
| 5,537,599 | A | 7/1996 | Tanaka | |
| 5,616,988 | A * | 4/1997 | Kim | 315/1 |
| 5,657,987 | A | 8/1997 | Pfutzenreuter | |
| 6,253,329 | B1 * | 6/2001 | Kang | 713/300 |
| 6,308,953 | B1 | 10/2001 | Nagano | |
| 6,351,824 | B1 * | 2/2002 | Singh | 714/23 |
| 6,671,756 | B1 * | 12/2003 | Thomas et al. | 710/73 |
| 2004/0209683 | A1 | 10/2004 | Okada | |
| 2005/0094180 | A1 * | 5/2005 | Nishimoto et al. | 358/1.13 |

FOREIGN PATENT DOCUMENTS

| | | |
|---|---|---|
| CA | 2167219 | 7/1997 |
| EP | 0 621 526 | 8/1994 |
| JP | 10-118290 | 5/1998 |
| JP | 2002-253771 | 9/2002 |

(Continued)

OTHER PUBLICATIONS

Anonymous. "ATX Power/Cooling", Url: http://web.archuve.org/web/20031205000510/http://www.compute-aid.com/atxspec.html>, retrieved on Dec. 5, 2003, pp. 1-7.

*Primary Examiner*—Chun Cao
(74) *Attorney, Agent, or Firm*—Leydig, Voit & Mayer, Ltd.

(57) ABSTRACT

When an alternating-current power is supplied to an ATX power supply, sub power is supplied to a PC board from the ATX power supply. When the sub power is supplied to the PC board, a PWOK signal is output to the ATX power supply by processing performed by a CPU according to BIOS, and main power is supplied to the PC board from the ATX power supply. Accordingly, the supply of the main power to the PC board and the starting processing of a gaming processing program are performed automatically, without any need for the conventional manual operation of a power supply switch, so that no effort is required for the starting of a slot machine.

8 Claims, 5 Drawing Sheets

FOREIGN PATENT DOCUMENTS

| | | |
|---|---|---|
| JP | 2003-111892 | 4/2003 |
| JP | 2003-180965 | 7/2003 |
| JP | 2003-340096 | 12/2003 |
| JP | 2004-167017 | 6/2004 |
| JP | 2004-216103 | 8/2004 |
| RU | 2 128 364 | 3/1999 |

* cited by examiner

POWER CONTROL FOR GAMING MACHINE

RELATED APPLICATION

This application claims the priority of Japanese Patent Application No. 2003-414289 filed on Dec. 12, 2003, which is incorporated herein by reference.

BACKGROUND OF THE INVENTION

1. Field of the Invention

The present invention relates to a gaming machine comprising a control board that starts and performs gaming processing when main power is supplied.

2. Description of the Prior Art

Conventionally, in gaming machines such as slot machines and the like, various types of gaming processing have been performed by a main CPU (central processing unit), ROM (read-only memory) and RAM (random access memory) disposed on a main control board in accordance with programs stored in the ROM (see Japanese Unexamined Patent Publication No. 2000-42169 (FIG. 5)).

Such gaming machines include machines in which a commercially marketed personal computer mother board mounted in a PC/AT exchange or the like is mounted as a main control board in order to achieve lower cost and higher performance in the gaming machine. This mother board is operated by receiving power from a power supply obtained by connecting a power supply conforming to the ATX standard, i.e., an ATX power supply. A power supply switch which is used to cause an ATX power supply to deliver the main power supply, and a reset switch which is used to reset the mother board, are disposed on this mother board. When an alternating-current power supply is connected to the ATX power supply, an auxiliary power is supplied to the mother board, and monitoring of the power supply switch is performed by processing based on the setting of the BIOS. While the alternating-current power supply is connected to the ATX power supply, an auxiliary power supply is constantly supplied to the mother board. In this case, when the power supply switch is operated so that an auxiliary power is supplied to the mother board, a signal requesting the supply of the main power supply is output to the ATX power supply from the mother board by the BIOS. When this signal is received by the ATX power supply, the main power is supplied to the mother board from the ATX power supply. When the main power is supplied to the mother board, the mother board starts up so that gaming processing is executed according to a gaming processing program stored in the ROM. Furthermore, mother boards include boards that do not start when only the power supply switch is operated, but rather start when the reset switch is operated following the operation of the power supply switch.

SUMMARY OF THE INVENTION

However, in the abovementioned conventional gaming machines in which a commercially marketed mother board is mounted, the installation of a power supply switch that operates the mother board, and a manual operation when the gaming machine is started, are required. In the case of a product such as a gaming machine, it is desirable that the gaming machine be started merely by the connection of an alternating-current power supply to the gaming machine.

The present invention is devised in order to solve such problems. A gaming machine constructed in accordance with the present invention comprising: a power supply that supplies auxiliary power when alternating-current power is switched on, and that supplies main power when the power supply receives a main power supply request signal that requests supply of the main power; and a control board which has first memory means for storing a BIOS, second memory means for storing a gaming processing program, first control means for performing processing according to the BIOS when said the auxiliary power is supplied, and second control means for starting the control board and performing gaming processing according to the gaming processing program when the main power is supplied, wherein the first control means perform processing that outputs the main power supply request signal to the power supply when the control board receives the auxiliary power supply.

Furthermore, a gaming machine constructed in accordance with the present invention comprising: a power supply that supplies auxiliary power when alternating-current power is switched on, and that supplies main power when the power supply receives a main power supply request signal that requests supply of the main power; and a control board which has first memory means for storing a BIOS, second memory means for storing a gaming processing program, first control means for performing processing according to the BIOS when the auxiliary power is supplied, and second control means for starting the control board and performing gaming processing according to the gaming processing program when the main power is supplied, wherein the gaming machine further comprises an external circuit which has detection means for detecting supply of the auxiliary power to the control board by the power supply, and pseudo power supply switching signal producing means for producing a pseudo power supply switching signal that outputs a main power supply request signal to the power supply and outputting the signal to the control board when the supply of the auxiliary power to the control board is detected by the abovementioned detection means.

Furthermore, in the present invention, the external circuit comprises pseudo reset switching signal producing means for producing a pseudo reset switching signal after a specified time has elapsed following the output of the pseudo power supply switching signal to the control board, and outputting the pseudo reset switching signal to the control board.

Furthermore, a gaming machine constructed in accordance with the present invention comprising: a power supply that supplies auxiliary power when alternating-current power is switched on, and that supplies main power when the power supply receives a main power supply request signal that requests supply of main power; and a control board which has first memory means for storing a BIOS, second memory means for storing a gaming processing program, first control means for performing processing according to the BIOS when the auxiliary power is supplied, and second control means for starting the control board and performing gaming processing according to the gaming processing program when the main power is supplied, wherein the first control means perform processing that outputs the main power supply request signal to the power supply when the control board receives the auxiliary power supply, and the gaming machine further comprises an external circuit which has detection means for detecting supply of the auxiliary power to the control board by the power supply, a pseudo power supply switching signal producing means for producing the pseudo power supply switching signal that outputs the main power supply request signal to the power supply and outputting the signal to the control board when the supply of the auxiliary power to the control board is detected by the abovementioned detection means, and pseudo reset switching signal producing means for producing a pseudo reset switching signal after a specified time has elapsed following the output of the pseudo power supply switching signal to the control board, and outputting this pseudo reset switching signal to the control board.

DESCRIPTION OF THE PREFERRED EMBODIMENTS

Next, preferred embodiments of the present invention will be described.

Figure 1:
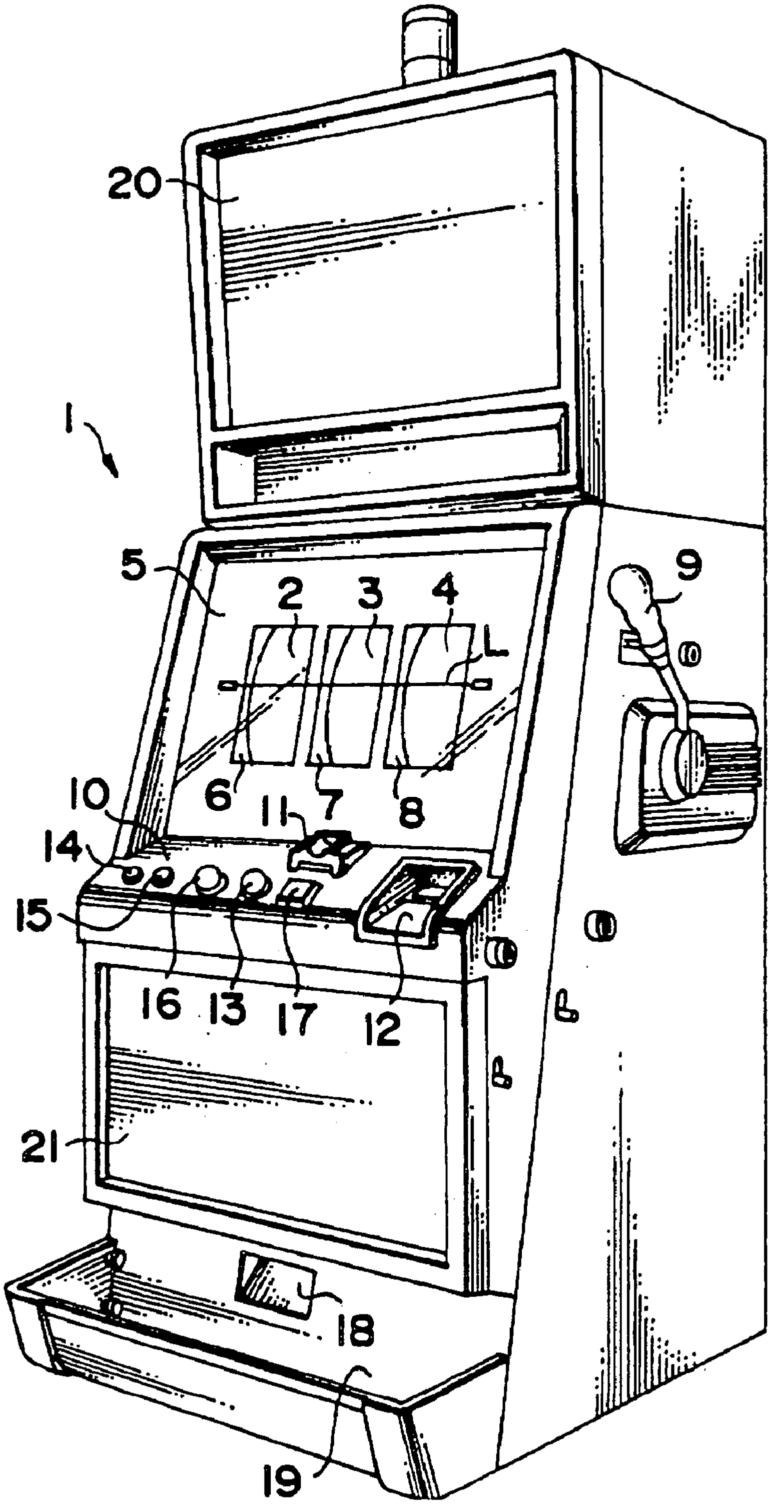
FIG. 1 is a perspective view of a slot machine according to one embodiment of the present invention.

FIG. 1 is a perspective view of a slot machine 1 according to a preferred embodiment of the present invention. Three reels, i.e., a first reel 2, a second reel 3 and a third reel 4, are installed inside the housing in the central part of the main body of the slot machine 1. Symbol rows consisting of a plurality of different types of patterns (hereafter referred to as symbols) are depicted on the outer circumferential parts of the respective reels 2 through 4. A reel display window part 5 is disposed in front of the reels 2 through 4. The symbols depicted on the outer circumferential parts of the respective reels 2 through 4 are displayed via display windows 6, 7 and 8 formed in this reel display window part 5 (with three symbols being displayed in each window). A variable display of these symbols is performed when the player inserts a coin or the like constituting the gaming medium and operates a handle 9 installed on the side surface of the housing. A prize winning line L which regulates the combination of the symbols is formed in the reel display window part 5, and the winning of prizes is determined by the combination of symbols that stop and are displayed on the prize winning line L in the respective display windows 6 through 8.

A coin entry 11 used for the insertion of coins by the player, and a bill entry 12 used for the insertion of bill by the player, are disposed in a control panel 10 positioned beneath the reel display window part 5. Furthermore, a spin switch 13 which is used to start the rotation of the reels 2 through 4 by a push-button operation separately from the operation of the handle 9 is disposed on this control panel 10; moreover, a change switch 14, cash out switch 15, bet 1 switch 16 and max bet switch 17 are also disposed on this control panel 10.

The change switch 14 is a switch that is used to call an employee of the gaming house; when this switch is operated, a tower light disposed on the upper part of the slot machine 1 is lit. The cash out switch 15 pays out (by means of a push button operation) winnings that have accumulated (hereafter referred to as credit) as coins into a coin tray 19 from a pay-out opening 18. Furthermore, by means of a single push button operation, the bet 1 switch 16 wagers a monetary amount equal to the amount that is wagered on a single bet (among the credited winnings) on the game. The max bet switch 17, by means of a single push button operation, wagers a monetary amount equal to the maximum number of bets on the game from the credited winnings.

Furthermore, a payout display which indicates the amounts that are paid out for prizes is shown on a top glass 20 above the reel display window part 5, and characters or the like of the gaming machine are depicted on a bottom glass 21 beneath the reel display window part 5.

Figure 2:
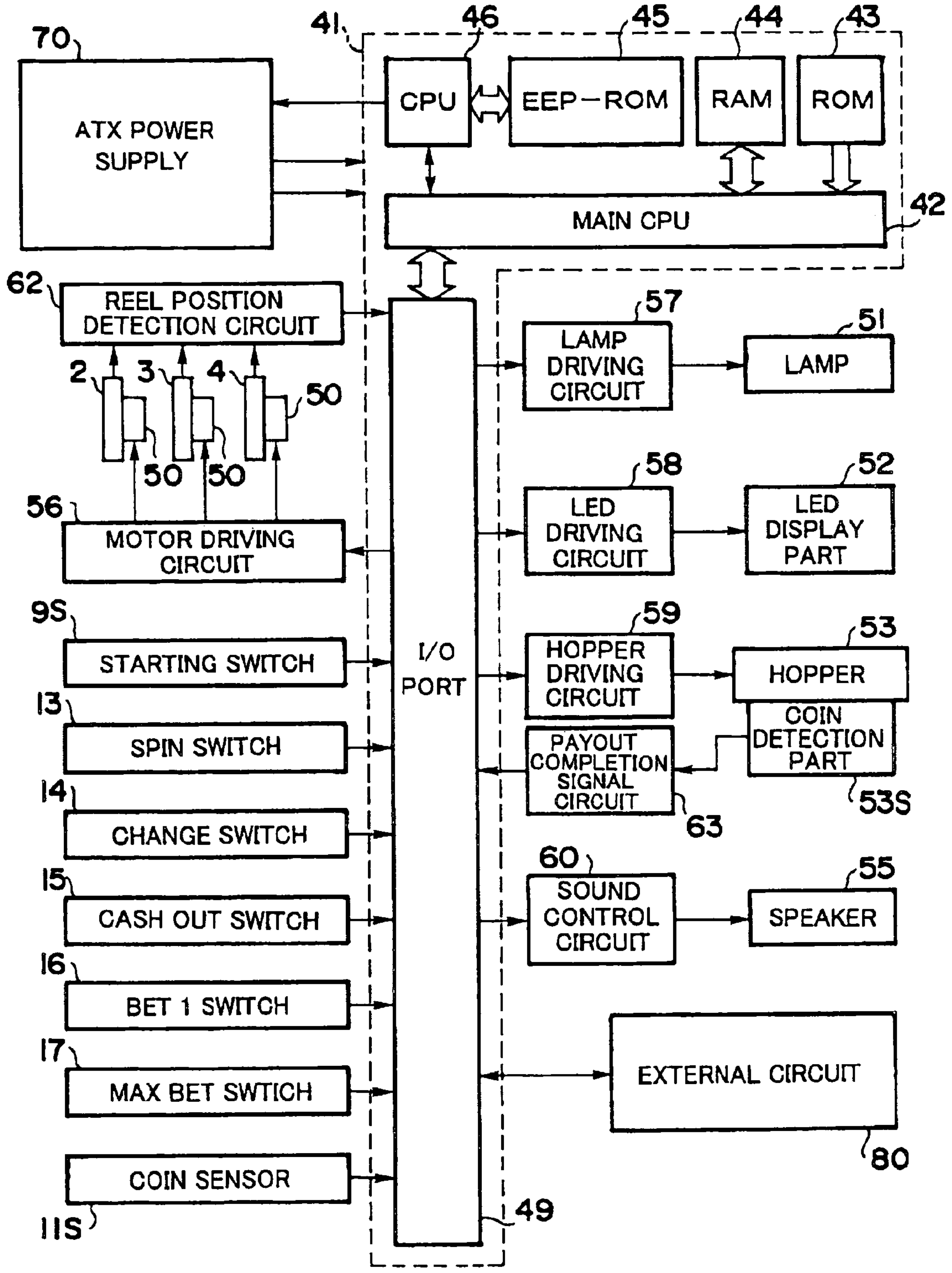
FIG. 2 is a block diagram showing the construction of the PC board that controls the gaming processing operation in the slot machine according to one embodiment of the present invention, and the peripheral devices that are connected to this PC board.

FIG. 2 is a block diagram which shows the construction of a personal computer mother board (hereafter referred to as a PC board) 41 that controls the gaming processing operation in the slot machine of the present embodiment, and peripheral devices that are connected to the PC board 41.

The PC board 41 is a commercially marketed PC board that conforms to the ATX standard; this PC board 41 comprises a CPU (central processing unit) constituting first control section, an EEP (electrically erasable programmable)-ROM 45 constituting first memory section that store a BIOS program that is operated by this CPU 46, a main CPU 42 constituting second control section, a ROM 43 constituting second memory section that store a gaming processing program that is operated by this main CPU 42, and a RAM (random access memory) 44 equipped with a backup control function. The CPU 46 performs processing according to a BIOS program that is stored in the EEP-ROM 45, and the main CPU 42 performs gaming processing according to a gaming processing program that is stored in the ROM 43. The RAM 44 is used as a temporary memory working region or the like when the gaming processing program is executed by the main CPU 42.

An I/O port 49 which exchanges signals between peripheral devices (actuators) described later and an external circuit 80 is connected to the main CPU 42. Furthermore, in the ROM 43, the memory part is divided so that a prize winning table or the like to which reference is made when prizes are determined from combinations of symbols is also stored in addition to the gaming processing program.

The main actuators whose operation is controlled by control signals from the main CPU 42 include stepping motors 50 that rotationally drive the respective reels 2 through 4, various lamps 51, various LED display parts 52, a hopper 53 that accommodates coins, and a speaker 55. These actuators are respectively driven and controlled by a motor driving circuit 56, lamp driving circuit 57, LED driving circuit 58, hopper driving circuit 59 and sound control circuit 60. These driving circuits 56 through 59 and sound control circuit 60 are connected to the main CPU 42 via the I/O port 49.

Furthermore, the main input signal generating section that generate input signals required for the production of control signals by the main CPU 42 include a start switch 9S that detects the operation of the handle 9, the spin switch 13, the change switch 14, the cash out switch 15, the bet 1 switch 16, the max bet switch 17, and a coin sensor 11S which detects coins that are inserted into coin entry 11. Furthermore, there is also a reel position detection circuit 62 that detects the rotational positions of the respective reels 2 through 4.

Moreover, a coin detection part 53S that detects the number of coins paid out from the hopper 53, and a payout completion signal generating circuit 63, are also provided as the abovementioned input signal generating section. The payout completion signal generating circuit 63 generates a signal that detects the completion of coin payout when the count value of the coins actually paid out that is input from the coin detection part 53S reaches data indicating the allotted number. The abovementioned payout completion signal generating circuit 63 is also connected to the main CPU 42 via the I/O port 49.

Furthermore, an ATX power supply 70 which provides a power supply that operates the PC board 41, and an external circuit 80 which performs power supply processing for this ATX power supply 70, are connected to the PC board 41.

Figure 3A:
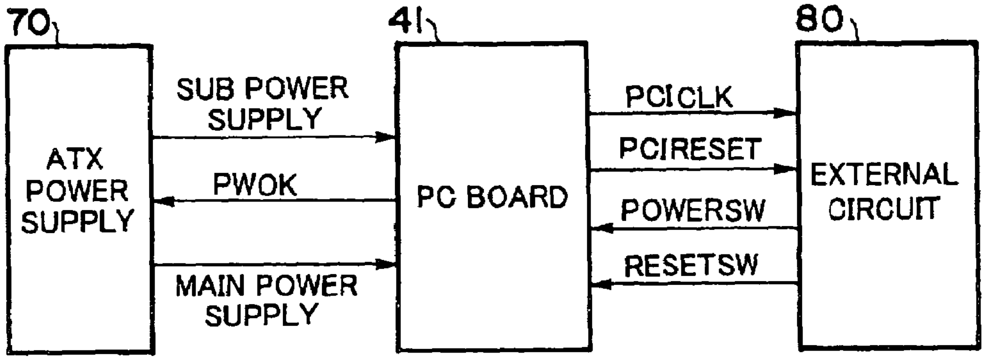
FIGS. 3A and 3B are diagrams which show the input-output relationship of signals between the PC board of the slot machine according to one embodiment of the present invention, and the external circuit and ATX power supply connected to this PC board.
Figure 3B:
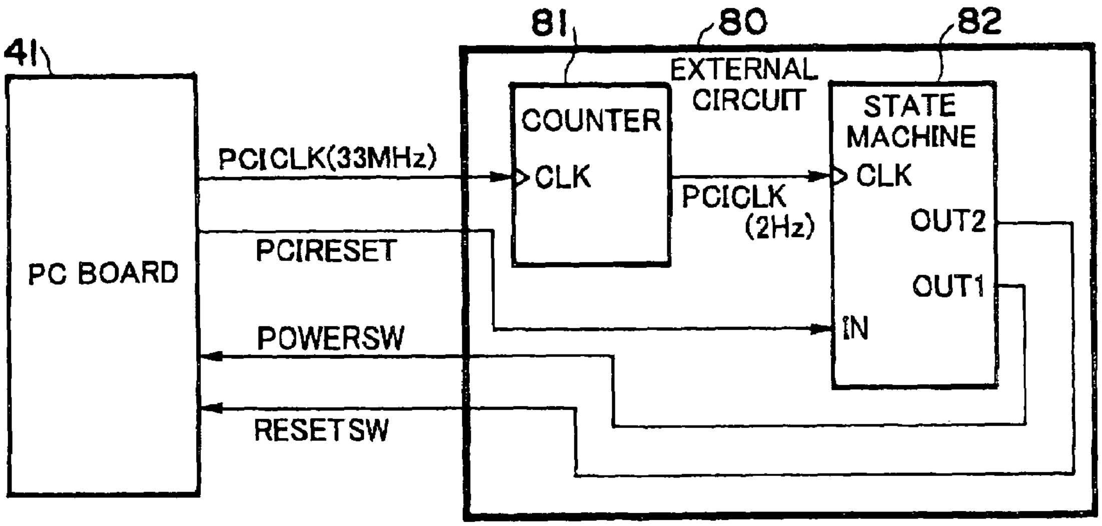

FIG. 3A shows the input-output relationship of signals between the PC board 41 shown in FIG. 2 and the ATX power supply 70 and external circuit 80 that are connected to this PC board 41. FIG. 3B is a block diagram which shows the internal construction of the external circuit 80.

The ATX power supply 70 is a power supply that conforms to the ATX standard. When an alternating-current power supply (not shown in the figures) is switched on, the ATX power supply 70 constantly supplies an auxiliary power (hereafter referred to as a sub power supply) to the PC board 41 as shown in FIG. 3A, and when a main power supply request signal (hereafter referred to as a PWOK signal) transmitted from the PC board 41 is received, the ATX power supply 70 supplies the main power supply to the PC board 41. The CPU 46 performs processing according to the BIOS when a sub power is supplied from the ATX power supply 70, and the main CPU 42 performs processing according to the gaming processing program when the main power is supplied.

As is shown in FIG. 3B, the external circuit 80 comprises a counter 81 and a state machine 82. When the sub power is supplied, the PC board 41 outputs a PCI bus clock (hereafter referred to as a PCICLK) signal of 33 [MHz] to the external circuit 80. The counter 81 subjects the PCICLK signal that is input into the CLK terminal from the PC board 41 to frequency division, and outputs a clock signal of 2 [Hz] to the state machine 82. The state machine 82 constitutes pseudo power supply switching signal producing section which produce a pseudo power supply switching signal (hereafter referred to as a POWERSW signal) that causes a PWOK signal to be output to the ATX power supply 70 from the PC board 41 when the frequency-divided PCICLK signal that is output from the counter 81 is input into the CLK terminal, and which output this POWERSW signal to the PC board 41 from the OUT1 terminal. Furthermore, the state machine 82 also constitutes pseudo reset switching signal producing section which produce a pseudo reset switching signal (hereafter referred to as a RESETSW signal) after a specified time has elapsed following the output of a POWERSW signal to the PC board 41, and output this RESETSW signal to the PC board 41 from the OUT2 terminal. Furthermore, the counter 81 and the state machine 82 also constitutes detection device that detect the supply of sub power to the PC board 41 by the ATX power supply 70. When a RESETSW signal is input, the PC board 41 resets the main CPU 42, and outputs a PCI bus reset (hereafter referred to as PCIRESET) signal to the IN terminal of the state machine 82.

Next, the starting processing of the PC board 41 will be described with reference to the operating explanatory diagram shown in FIG. 4 and the timing charts shown in (a) and (d) of FIG. 5.

Figure 4:
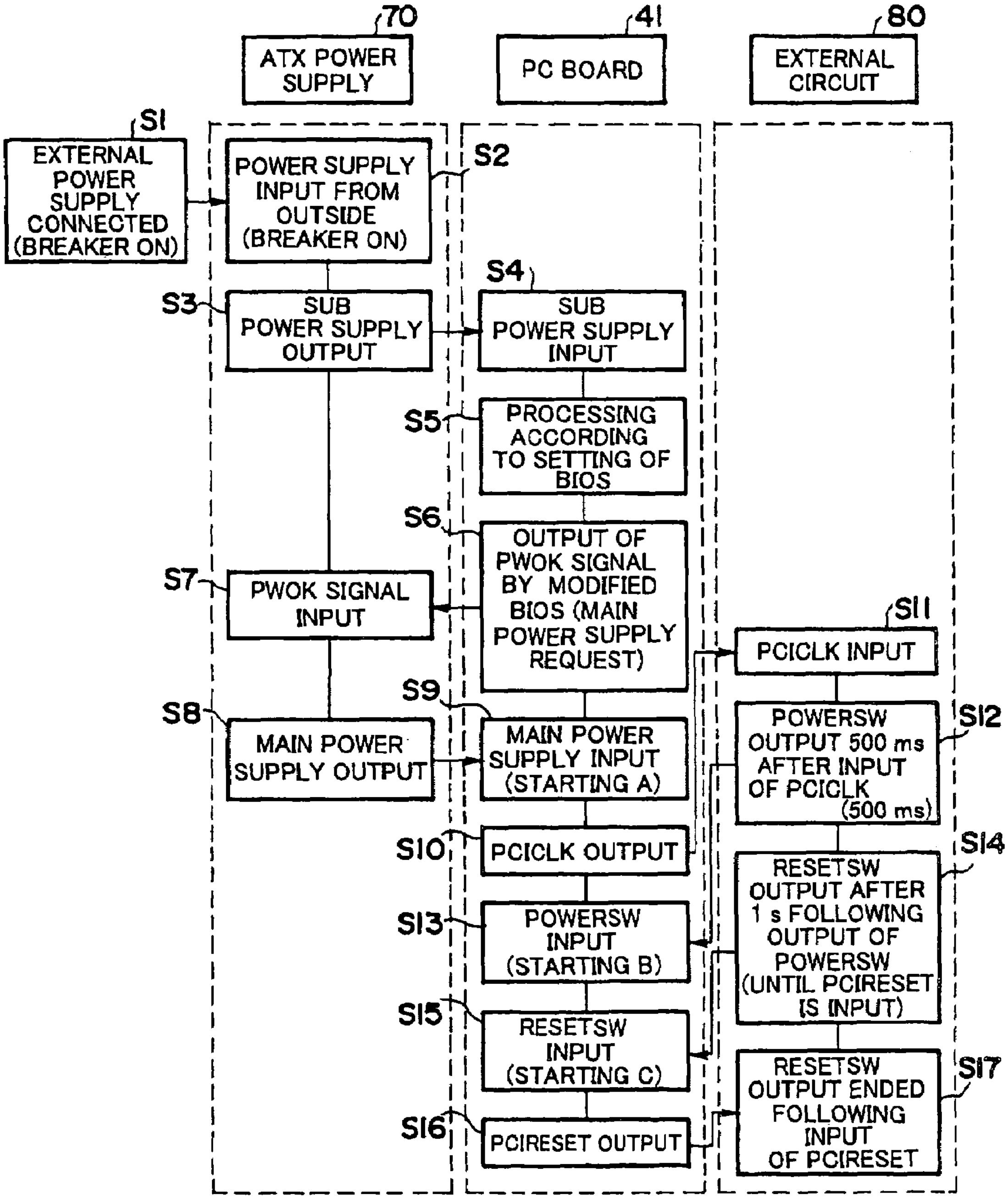
FIG. 4 is an operating explanatory diagram which shows the starting processing of the PC board in the slot machine according to one embodiment of the present invention.

First, when the breaker is switched ON so that the external power supply is connected (see FIG. 4, step (hereafter noted as “S”) 1), an alternating-current power is supplied to the ATX power supply 70 (S2), and a sub power supply is output to the PC board 41 from the ATX power supply 70 (S3). In the PC board 41, when the sub power supply is input (S4), processing is performed according to the setting of the BIOS (S5). For example, in cases where the power supply switch is connected to the mother board, this processing includes monitoring of the operation and the like. The CPU 46 performs processing that outputs a PWOK signal to the ATX power supply 70 in accordance with the processing based on the setting of the BIOS (S6). When a PWOK signal is input into the ATX power supply 70 (S7), the main power supply is output to the PC board 41 from the ATX power supply 70 (S8). When the main power supply is input into the PC board 41, the CPU 46 performs the starting processing (starting A) of the gaming processing program (S9).

When the main power supply is input into the PC board 41, a PCICLK signal of 33 [MHz] is output to the external circuit 80 from the PC board 41 beginning at time t1 (S10). This PCICLK signal is subjected to frequency division by the counter 81 of the external circuit 80, and is input into the state machine 82 as the clock signal of 2 [Hz] shown in FIG. 5(*a*) (S11). When this PCICLK signal is input, the state machine 82 outputs a POWERSW signal to the PC board 41 at a timing of time t2, at which a time of 500 [ms] has elapsed from time t1 (S12). When this POWERSW signal is input into the PC board 41, the CPU 46 again performs starting processing (starting B) of the gaming processing program (S13). The output of the POWERSW signal is ended at a timing of time t3, at which a time of 500 [ms] has elapsed from time t2.

Figure 5:
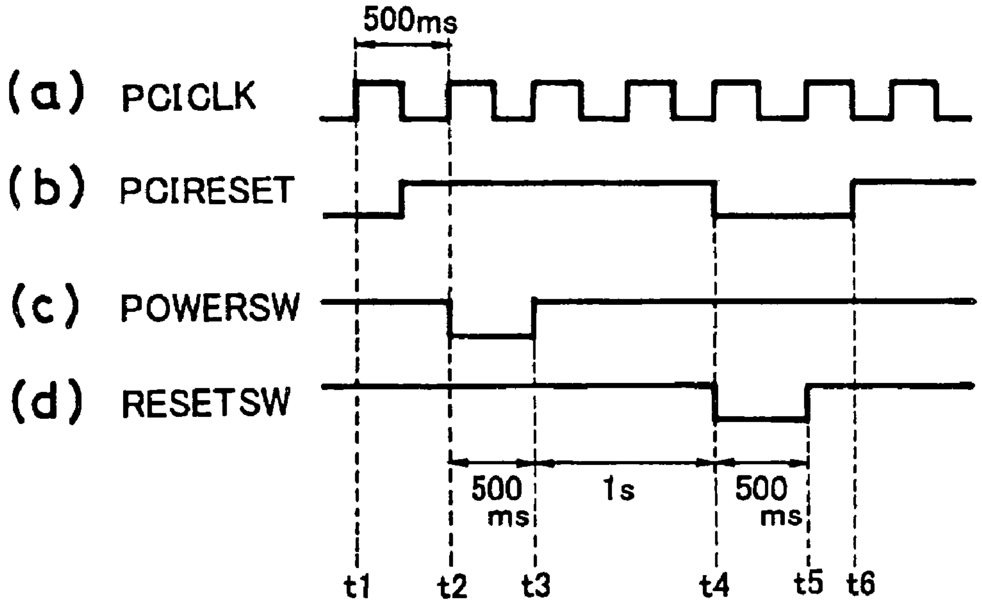
FIG. 5 is a timing chart which shows the transitions of the respective signals in the external circuit of the slot machine according to one embodiment of the present invention.

As is shown in (c) and (d) of FIG. 5, the state machine 82 outputs a RESETSW signal to the PC board 41 at a timing of time t4, at which a time of 1 [s] has elapsed from the ending of the output of the POWERSW signal (S14). In the PC board 41, which requires the input of two signals, i.e., the POWERSW signal and the RESETSW signal, for starting processing, starting processing is not performed by the starting B in S13. However, when this RESETSW signal is input into the PC board 41 following the POWERSW signal, the CPU 46 performs starting processing (starting C) of the gaming processing program at a timing of time t4 (S15). When the CPU 46 performs this starting processing, a PCIRESET signal is output to the state machine 82 of the external circuit 80 from the PC board 41 (S16). The state machine 82 checks the state of the PCIRESET signal at time t5, at which a time of 500 [ms] has elapsed from the output of the RESETSW signal, and when a low level of the PCIRESET signal is detected as shown in FIG. 5(*b*), the state machine 82 judges that the PC board 41 has been reset, and ends the output of the RESETSW signal (S17). The output of the PCIRESET signal is ended at the subsequent time t6.

In such a slot machine 1 of the present embodiment, as is described above, a sub power is supplied to the PC board 41 from the ATX power supply 70 when an alternating-current power supply is connected to the ATX power supply 70. When a sub power is supplied to the PC board 41, a PWOK signal is output to the ATX power supply 70 by the processing of the CPU 46 according to the BIOS, and the main power is supplied to the PC board 41 from the ATX power supply 70. Accordingly, there is no need for a conventional manual operation of the power supply switch, and the supply of the main power supply to the PC board 41 and starting processing (starting A) of the gaming processing program are performed automatically. As a result, the starting of the slot machine 1 requires no effort. Furthermore, the installation of a power supply switch as in conventional devices is unnecessary.

Furthermore, when a sub power is supplied to the PC board 41, this supply of the sub power is detected by the state machine 82 installed in the external circuit 80. When the supply of this sub power is detected, the state machine 82 outputs a POWERSW signal to the PC board 41. When a POWERSW signal is input into the PC board 41, the starting processing (starting B) of the gaming processing program is again automatically performed by the processing of the CPU 46. Accordingly, even in cases where the automatic starting processing (starting A) of the gaming processing program is for some reason not performed by the processing of the CPU 46 according to the BIOS, automatic starting processing (starting B) of the gaming processing program is again performed at this point in time. Consequently, since a second starting processing is thus automatically performed, situations in which the slot machine 1 does not start in a normal manner can be eliminated.

Furthermore, in the present embodiment, when a POWERSW signal is output, a RESETSW signal is output to the PC board 41 from the state machine 82 after 500 [ms]. When a RESETSW signal is input into the PC board 41, starting processing (starting C) of the gaming processing program is automatically performed by the processing of the CPU 46 according to the BIOS in the PC board 41, which requires the input of a RESETSW signal along with a POWERSW signal for starting processing. Accordingly, even in a slot machine 1 using a PC board 41 that requires a RESETSW signal along with a POWERSW signal for starting processing, no effort is required for the starting of the slot machine 1.

Furthermore, in the abovementioned embodiment, a case is described in which starting processing of the PC board 41 is also performed by starting processing of starting B and starting C depending on a POWERSW signal and RESETSW signal from the external circuit 80 along with starting A based on processing by the CPU 46 according to the BIOS. However, the present invention is not limited to this. For example, a construction may also be used in which starting processing of the PC board 41 is performed by performing only processing that outputs a PWOK signal to the ATX power supply by means of processing performed by the CPU 46 according to the BIOS.

Furthermore, it would also be possible to use a construction in which starting processing of the PC board 41 based on processing performed by the CPU 46 according to the BIOS is not performed, a PWOK signal is output to the ATX power supply 70 by a POWERSW signal from the external circuit 80, and starting processing is performed by receiving the main power supply from the ATX power supply 70. Alternatively, in the case of a PC board 41 in which starting processing is performed not by the abovementioned POWERSW signal, but by two signals, i.e., the POWERSW signal and RESETSW signal, a construction may be used in which starting processing based on these two input signals is performed.

There is no need for the manual operation of a conventional power supply switch in any of the abovementioned constructions; instead, the power supply control of the PC board 41 can be performed automatically, and the starting processing of the gaming processing program is performed automatically. As a result, the slot machine 1 is started merely by switching on the breaker that connects the alternating-current power supply to the slot machine 1.

In the abovementioned embodiment, a case is described in which the gaming machine of the present invention is applied to a slot machine. However, the present invention can also be applied to other gaming machines besides slot machines, such as pachinko machines or video game machines. Actions and effects similar to those of the abovementioned embodiment can also be obtained in cases where the present invention is applied to such gaming machines.

What is claimed is:

1. A gaming machine comprising:

a power supply that supplies auxiliary power when alternating-current power is switched on, and that supplies main power when said power supply receives a main power supply request signal that requests supply of the main power; and a control board having a first memory section storing a BIOS, a second memory section storing a gaming processing program, a first control section performing processing according to the BIOS when the auxiliary power is supplied, and a second control section starting said control board and performing gaming processing according to the gaming processing program when the main power is supplied, wherein said first control section performs processing that outputs the main power supply request signal to said power supply when the auxiliary power is supplied to said control board by said power supply, and, if a power supply switch is connected to the control board, the main power supply request signal is output to said power supply based on monitoring of operation of said power supply switch.

2. The gaming machine according to claim 1, selected from the group consisting of a slot machine, a pachinko machine, and a video game machine.

3. A gaming machine comprising:

a power supply that supplies auxiliary power when alternating-current power is switched on, and that supplies main power when said power supply receives a main power supply request signal that requests supply of the main power;

a control board having a first memory section storing a BIOS, a second memory section storing a gaming processing program, a first control section performing processing according to the BIOS when the auxiliary power is supplied and, if a power supply switch is connected to the control board, the main power supply request signal is output to said power supply based on monitoring of operation of said power supply switch, and a second control section starting said control board and performing gaming processing according to the gaming processing program when the main power is supplied; and an external circuit which has a detection device detecting supply of the auxiliary power to said control board by said power supply, a pseudo power supply switching signal producing section producing a pseudo power supply switching signal that causes the main power supply request signal to be output to said power supply, and outputting the pseudo power supply switching signal to said control board when the supply of the auxiliary power to said control board is detected by said detection device.

4. The gaming machine according to claim 3, wherein said external circuit comprises a pseudo reset switching signal producing section producing a pseudo reset switching signal after a specified time has elapsed from the output of the pseudo power supply switching signal to said control board, and outputting the pseudo reset switching signal to said control board.

5. The gaming machine according to claim 3, wherein said external circuit comprises a counter which frequency divides an input clock signal to, and outputs a frequency-divided clock signal to said pseudo power supply switching signal producing section.

6. The gaming machine according to claim 3, selected from the group consisting of a slot machine, a pachinko machine, and a video game machine.

7. A gaming machine comprising:

a power supply tat supplies auxiliary power when alternating-current power is switched on, and that supplies main power when said power supply receives a main power supply request signal that requests supply of main power; and a control board having a first memory section storing a BIOS, a second memory section storing a gaming processing program, a first control section performing processing according to the BIOS when the auxiliary power is supplied, and a second control section starting said control board and performing gaming processing according to the gaming processing program when the main power is supplied, wherein said first control section performs processing that outputs the main power supply request signal to said power supply when the auxiliary power is supplied to said control board by said power supply, and, if a power supply switch is connected to the control board, the main power supply request signal is output to said power supply based on monitoring of operation of said power supply switch; and an external circuit which has a detection device detecting supply of the auxiliary power to said control board by said power supply, a pseudo power supply switching signal producing section producing a pseudo power supply switching signal that causes the main power supply request signal to be output to said power supply, and outputting the pseudo power supply switching signal to said control board when the supply of the auxiliary power to said control board is detected by said detection device, and a pseudo reset switching signal producing section producing a pseudo reset switching signal after a specified time has elapsed from the output of the pseudo power supply switching signal to said control board, and outputting the pseudo reset switching signal to said control board.

8. The gaming machine according to claim 7, selected from the group consisting of a slot machine, a pachinko machine, and a video game machine.

* * * * *